Sept. 12, 1967 K. H. FRANTZEN 3,340,648
CROP GROWTH IMPROVEMENT BY MEANS OF
PROPANE ACTUATED THERMOPILE Filed Aug. 19, 1963 2 Sheets-Sheet 1

INVENTOR.
Karl H. Frantzen
BY
Merriam, Smith & Marshall
attorneys

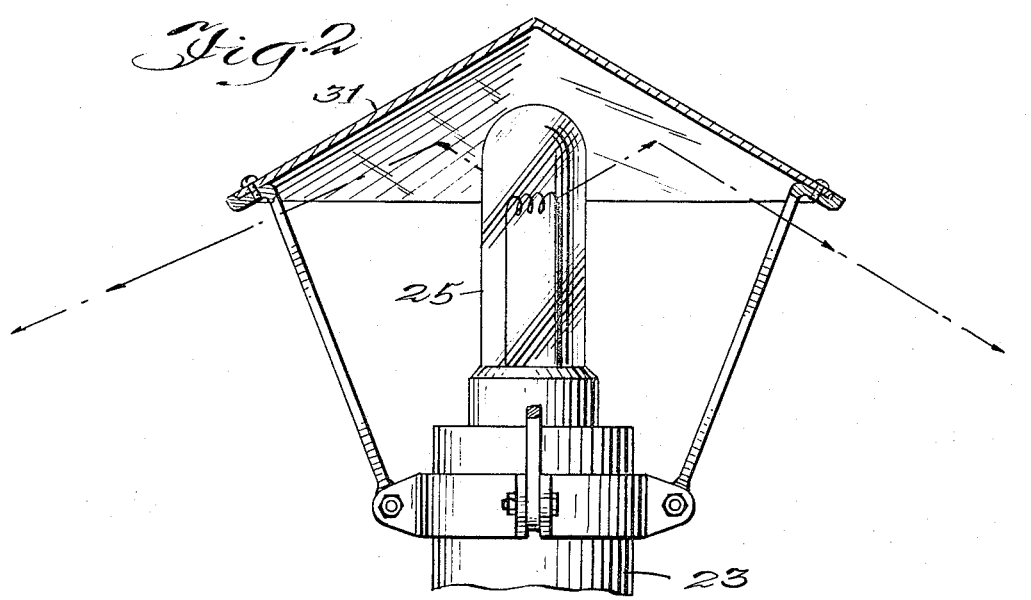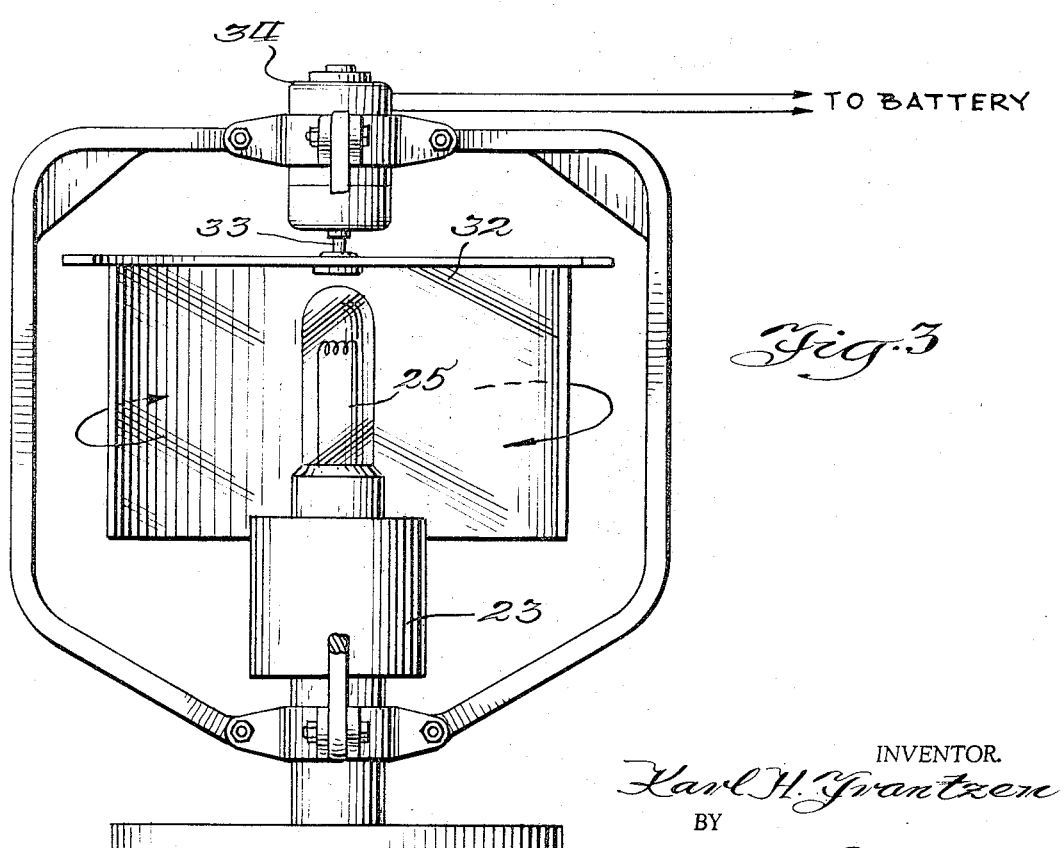

United States Patent Office 3,340,648
Patented Sept. 12, 1967

3,340,648
CROP GROWTH IMPROVEMENT BY MEANS OF PROPANE ACTUATED THERMOPILE
Karl H. Frantzen, Omaha, Nebr., assignor to Northern Gas Products Company, Omaha, Nebr., a corporation of Delaware
Filed Aug. 19, 1963, Ser. No. 303,056
5 Claims. (Cl. 47—58)

This invention relates generally to an improved method of growing corn grain and other crops through the use of a propane operated fuel cell which flashes intermittent beams of radiant energy.

The farmer, in growing food crops, e.g., corn grain, is continually confronted with an increased per acre cost accrued in the production of a particular crop yield per acre. Were the farmer able to maintain a relatively constant production cost while increasing his corn grain yield per acre, his overall profit would increase. It is the intention of the present invention to increase this crop yield without a substantial increase in cost of crop production.

In the growth of crops, photosynthesis occurs. This is a process whereby carbohydrates are synthesized from carbon dioxide in water by means of chloroplasts of living cells in the presence of light with oxygen being a by-product. The chemical expressions for this process can be stated:

$$6CO_2 + 6H_2O + 673 \text{ kg. cal.} \rightarrow C_6H_{12}O_6 + 6O_2$$

An analysis of the energy requirements to produce photosynthesis in corn production has resulted in the following.

| | |
|---|---|
| Energy required for the synthesis of 1 kg. of glucose _____ kg. cal.__ | 3,760 |
| Total energy utilized in photosynthesis by an acre of corn plants in the manufacture of 8,732 kg. glucose ___ kg. cal.__ | 33,000,000 |
| Total solar energy available on an acre during the growing season __ kg. cal.__ | 2,043,000,000 |
| Percent of available energy used by corn plant in photosynthesis, namely its photosynthetic efficiency ___ percent__ | 1.6 |

Since in a typical corn crop, the bulk is harvested as grain, a 100 bushel per acre yield would represent approximately 25% of the total carbohydrates formed. An evaluation of this yield in light of the above table discloses that the efficiency of the radiant energy used for the production of corn grain is reduced to approximately 0.4% of the total solar energy available. If the efficiency of the radiant energy were increased from 0.4% to even 0.5%, there would result a 25 bushel increase in corn grain per acre of corn crop.

It has been determined that when flashes of light are interrupted by periods of darkness, the photosynthetic yield on Chlorella specimens per unit of light is 400% greater than continuous light. Thus, products of light reaction form faster than they can be used under continuous light, whereas under intermittent light, the dark reaction can utilize the products formed by light reactions more efficiently, thus increasing the photosynthetic output.

During the periods when continuous light is present, carbohydrates, made from the reduction of carbon dioxide and water under the influence of chlorophyll and radiant energy, are produced faster than they can be utilized such that a flooding of this product occurs in the structure of the plant. However, when the radiant energy is supplied intermittently having light periods in which the products are produced and dark periods wherein they are utilized in the plant itself, the flooding is minimized, with the overall effect being that the conversion of energy to carbohydrates is increased.

Conversion of the data submitted in the above table discloses the radiant energy required to produce a 56 lb. bushel of corn grain is 1,390,600 B.t.u.'s. Based on a photosynthetic yield efficiency of approximately 400% for intermittent versus continuous light, 3,274 B.t.u.'s are required to produce one bushel of corn grain.

To furnish the necessary fuel requirements set forth above presents a number of problems. It is imperative that the fuel apparatus be designed for mobility from one crop area to another. In addition, the unit should incorporate its own fuel supply, thus alleviating any need for gas lines or electrical conduit lines leading to some distant power source. I have discovered that a propane actuated thermopile is a suitable and economical apparatus for providing the radiant energy requirements. The thermopile, a thermo electrical device, is capable of producing a required low voltage current by the conversion of heat energy to electrical energy. This is accomplished by the use of dissimilar materials constructed such that one junction of the materials is heated while the temperature of the remaining junction is fixed or cooled, the effect of which is to cause a current to flow. A condenser is used to store electrical energy produced from the thermopile to a sufficient level so that an attached flash tube may convert the electrical energy into an intermittent source of radiant energy. The fuel supply for the unit is bottled propane which can readily be replaced upon depletion. Moreover, the use of bottled propane allows the apparatus to be extremely compact and mobile.

FIGURE 2 is a further embodiment of the deflecting means shown in FIGURE 1; and

FIGURE 3 is also a further embodiment of the deflector means showing a power driven radiant energy deflector means.

Figure 1:
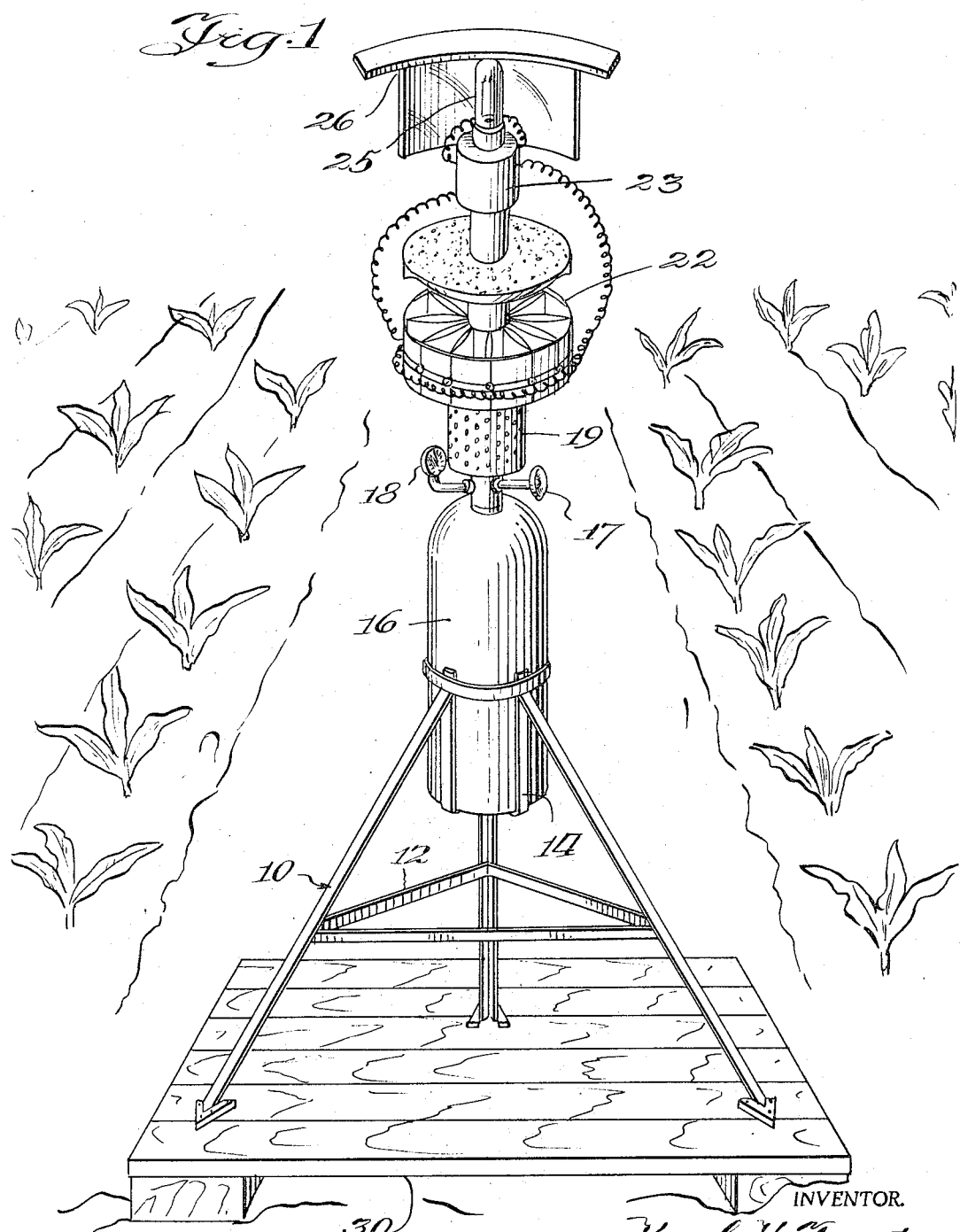
FIGURE 1 is a view of the apparatus for producing an intermittent source of radiant energy.

Referring to the drawings, the apparatus for producing a source of intermittent radiant energy consists of a triangular supporting stand 10 having legs 11 and support braces 12. The support stand is attached in any suitable manner to a carrier 30 which can be readily moved to any desired location in a field of crops. One end of each of legs 11 is suitably attached, e.g., by welding or a bolt and nut arrangement, to an adjustable tank retaining ring 13. Depending from ring 13 are legs 14, one portion of each leg 14 being bent substantially 90°, the bent end being attached to a base plate (not shown). Legs 14 and the base plate act as a holding means for a tank 16 of bottled propane fuel. At the neck of tank 16, regulating valve 17 and pressure gauge 18 are located. In combustion chamber 19 the propane, or other suitable fuel, is converted to heat energy which is used to heat junction 20 of thermopile 21, junction 20 consisting of two dissimilar materials, e.g., iron and constantan. The remaining junction 22 is cooled, if desired, or may remain at a fixed temperature. Heating the one junction while the remaining junction is at a cooled or fixed temperature produces a low voltage. Positioned between condenser 23, which is used to store the electrical energy to a sufficient level, and thermopile 21 is an insecticide volatilizing dish 24 which is controllably heated by any suitable means. This heated dish will act as a means for volatilizing crystalline forms of insecticidal materials which aid in controlling the nocturnal activities of egg laying adult insects. Attached to the remaining end of the condenser is flash tube 25 which will emit an intermittent source of radiant energy.

Positioned about tube 25 is an adjustable light shield 26 which deflects the radiant energy emitted from tube 25 to a desired location in the field of growing crops. In FIGURES 2 and 3 are shown additional embodiments of the radiant energy deflecting means. In FIGURE 2, an umbrella type of deflector 31 is used to deflect radiant energy beams emitted from tube 25 whereas in FIGURE 3, a deflecting shield 32 is coupled to and suspended from the shaft 33 of motor 34. The power required to drive motor 34 can be either a battery means (not shown) which is located on carrier 30 or suitable energy for the motor can be obtained through a connection to condenser 23. Upon activation of motor 34, shaft 33 and the suspended deflector shield 32 are rotated with radiant beams of energy being deflected to different areas of the crop at desired intervals.

The energy value for propane amounts to 19,040 B.t.u.'s per gallon. Based on this figure, and a heat-to-light conversion of approximately 10%, there would be expended about 1.72 gallons of propane per bushel of corn grain produced. The heat-to-light conversion factor used above may vary from about 5% to 30%.

The propane actuated device, preferably located on a portable carrier 30, supplies energy to a flash tube 25 which, in turn, emits intermittent beams of radiant energy to the corn crop. The apparatus has a sufficient fuel supply for suppling the necessary radiant energy output for several acres of corn. Operation of the unit occurs from dusk until dawn, approximately 5 hours, and from the middle of June to about the middle of September, or in the neighborhood of approximately 90 days, assuming corn belt area conditions.

Though propane has been set forth as the preferred fuel to be used in the apparatus for producing a source of radiant energy, other hydrocarbons could also be used.

The radiant energy referred to in this specification is that energy which will allow crops to grow and photosynthesis to occur.

The foregoing detailed description has been given for the purpose of understanding only, and no unnecessary limitations should be understood therefrom, as modifications will be obvious to those skilled in the art.

What is claimed is:

1. The method of increasing the growth of crops comprising the steps of:
    locating an intermittent light means and a self-contained source of fuel in the form of a hydrocarbon having chemical energy unit in a crop field;
    converting said chemical energy in said unit into electrical energy; and
    supplying said electrical energy to said light means whereby intermittent beams of radiant energy are emitted, the totality of said radiant energy being derived from said conversion of said chemical energy from said self-contained source of fuel.

2. The method in accordance with claim 1 wherein said energy unit and intermittent light means are actuated during the hours from dusk to dawn.

3. The method of improving the growth of a crop comprising the steps of:
    locating an apparatus for producing a source of intermittent radiant energy in an area where crops are grown;
    supplying a self-contained source of fuel in the form of a hydrocarbon having chemical energy as a source of fuel to said apparatus;
    during periods of darkness, actuating said apparatus to convert said chemical energy in said fuel to electrical energy and said electrical energy to intermittent radiant energy, said radiant energy being that energy which will allow crops to grow and photosynthesis to occur; and
    deflecting said intermittent radiant energy to said crops, the totality of said radiant energy being derived from said conversion of said chemical energy from said self-contained source of fuel.

4. In the method of improving the growth of crop by supplying intermittent light to said crop during periods of darkness, said method comprising:
    providing a self-contained, bottled supply of a hydrocarbon in the vicinity of said crop;
    oxidizing said hydrocarbon thereby producing chemical energy which actuates a thermopile to produce electrical energy;
    converting said electrical energy to radiant energy; and
    directing said radiant energy intermittently to said crop, the totality of said radiant energy being derived from the converting of said chemical energy from said bottled supply of hydrocarbon.

5. The method of claim 4 wherein propane is provided as said hydrocarbon.

References Cited
UNITED STATES PATENTS

| | | | |
|---|---|---|---|
| 923,474 | 6/1909 | Willson | 240—11 |
| 1,228,006 | 5/1917 | Eckart | 47—58 |
| 1,854,791 | 4/1932 | Harris | 240—82 |
| 2,300,727 | 11/1942 | Durling | 47—58 |
| 2,742,342 | 4/1956 | Dew et al. | 43—129 |
| 2,816,394 | 12/1957 | Loibl | 43—129 |

OTHER REFERENCES

The Response of Plants to Intermittent Supplementary Light, E. P. Hume, Proceedings of the American Society for Horticultural Science, 1939 (vol. 37), pp. 1059–1065.

ABRAHAM G. STONE, *Primary Examiner.*

ROBERT E. BAGWILL, *Examiner.*